US010086436B2

(12) United States Patent
Sasaki (10) Patent No.: US 10,086,436 B2
(45) Date of Patent: Oct. 2, 2018

(54) CUTTING TOOL HAVING BREAKER WALL SURFACES SEPARATED BY A CONVEX PORTION (71) Applicant: Tungaloy Corporation, Iwaki-shi (JP)

(72) Inventor: Yasutake Sasaki, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 269 days.

(21) Appl. No.: 14/916,064

(22) PCT Filed: Dec. 2, 2014

(86) PCT No.: PCT/JP2014/081909
§ 371 (c)(1),
(2) Date: Mar. 2, 2016

(87) PCT Pub. No.: WO2015/083716
PCT Pub. Date: Jun. 11, 2015

(65) Prior Publication Data
US 2016/0214180 A1 Jul. 28, 2016

(30) Foreign Application Priority Data
Dec. 3, 2013 (JP) .................................. 2013-249914

(51) Int. Cl.
*B23B 27/22* (2006.01)
*B23B 27/14* (2006.01)
*B23B 27/18* (2006.01)

(52) U.S. Cl.
CPC ............ *B23B 27/141* (2013.01); *B23B 27/18* (2013.01); *B23B 2200/0423* (2013.01);
(Continued)

(58) Field of Classification Search
CPC ...... B23B 27/18; B23B 27/143; B23B 27/141; B23B 2200/0447; B23B 2200/081; B23B 2200/087
See application file for complete search history.

(56) References Cited

U.S. PATENT DOCUMENTS 4,335,984 A * 6/1982 Zweekly ............... B23B 27/143
407/114
4,616,963 A 10/1986 Habert et al.
(Continued)

FOREIGN PATENT DOCUMENTS

JP H11-048006 2/1999
JP 2007-260848 3/2006
(Continued)

OTHER PUBLICATIONS

English Translation of JP 2007-260848, Mar. 2006.*
(Continued)

*Primary Examiner* — Alan Snyder
(74) *Attorney, Agent, or Firm* — Studebaker & Brackett PC (57) ABSTRACT

A cutting tool includes a cutting edge member. The cutting edge member forms a corner portion. The cutting edge member includes a cutting edge formed at the intersection of a rake surface and a flank, at least two breaker wall surfaces and at least one convex portion. The cutting edge includes a first cutting edge and a second cutting edge connected thereto. The second cutting edge is situated at the corner portion. Each breaker wall surface is formed to extend along the cutting edge. The convex portion is formed between the two breaker wall surfaces spaced from each other to protrude relatively toward the cutting edge side. A part of the convex portion is situated around a connecting portion of the first and second cutting edges.

19 Claims, 11 Drawing Sheets

(52) U.S. Cl.
  CPC . *B23B 2200/0447* (2013.01); *B23B 2200/081* (2013.01); *B23B 2200/087* (2013.01); *B23B 2226/125* (2013.01); *B23B 2226/31* (2013.01); *B23B 2226/315* (2013.01)

(56) References Cited

U.S. PATENT DOCUMENTS

| | | |
|---|---|---|
| 5,921,722 A | 7/1999 | Paya et al. |
| 2008/0219784 A1 | 9/2008 | Yamazaki et al. |
| 2012/0177452 A1 | 7/2012 | Konta |
| 2015/0075338 A1 | 3/2015 | Onodera |

FOREIGN PATENT DOCUMENTS

| | | | |
|---|---|---|---|
| JP | 2007-301669 | 5/2006 | |
| JP | WO 2013129083 A1 * | 9/2013 | ........... B23B 27/143 |

OTHER PUBLICATIONS

International Search Report dated Feb. 17, 2015 issued in counterpart International (PCT) Application (No. PCT/JP2014/081909).
Extended European Search Report dated Jun. 29, 2017, issued in counterpart European application (No. 14866882.5).

\* cited by examiner

CUTTING TOOL HAVING BREAKER WALL SURFACES SEPARATED BY A CONVEX PORTION

RELATED APPLICATIONS

This is a 371 US National Phase of International Patent Application No. PCT/JP2014/081909 filed Dec. 2, 2014, and published as WO 2015/083716A1 on Jun. 11, 2015, which claims priority to JP 2013-249914, filed Dec. 3, 2013. The contents of the aforementioned applications are incorporated by reference in their entirety.

TECHNICAL FIELD

This invention relates to a cutting tool comprising a cutting edge member in a region including a corner portion, and more particularly, to a cutting tool with the cutting edge member including an ultrahigh-pressure sintered compact.

BACKGROUND ART

A cutting tool having a cutting edge portion formed of a so-called ultrahigh-pressure sintered compact is conventionally known. Such a cutting tool is fit for use in cutting of high hardness materials such as hardened steel, carburized steel and so on, cutting of cast iron and cast steel, cutting of sintered metals, high-speed cutting of nonferrous metals such as an aluminum alloy and the like, and the like.

One of the conventional cutting tools with ultrahigh-pressure sintered compact in the related art is described in PTL 1. The cutting tool described in PTL 1 has a cutting edge member formed of an ultrahigh-pressure sintered compact containing at least one of diamond and Cubic Boron Nitride. A rake surface is formed on the upper surface of the cutting edge member. A flank is formed on the periphery of the cutting edge member. A cutting edge having an arc-shaped corner cutting edge is formed at the intersection of the rake face and the flank. On the surface of the cutting edge member, two breaker wall surfaces are formed in such a manner as to intersect with each other on the bisector of a corner portion in which the aforementioned corner cutting edge is placed. Further, a distal-end breaker surface is formed on the intersecting portion of the two breaker wall surfaces to be pointed at the leading end side of the corner portion in order to improve the chip treatability.

CITATION LIST

Patent Literature

PTL 1: Japanese Patent Laid-Open No. 2007-260848

SUMMARY OF INVENTION

Technical Problem

The cutting process may take the cutting form in which the direction of chip flow changes more frequently, in particular, the cutting form known as "profiling machining". In such cutting, upgrading of the chip treatability is desired. The cutting tool according to PTL 1 has room for improvement in flexible measures concerning changes in the direction of chip flow.

The present invention has been made in light of such circumstances and it is an object of the present invention to provide a cutting tool capable of increasing the chip treatability in the cutting operation in which the direction of chip flow changes.

Solution to Problem

According to an aspect of the present invention, there is provided a cutting tool including a cutting edge member forming at least one corner portion, comprising:
a cutting edge formed at the intersection of a rake face and a flank, the cutting edge including a first cutting edge and a second cutting edge connected to the first cutting edge, the second cutting edge being situated in the corner portion of the cutting edge member;
at least two breaker wall surfaces including a breaker wall surface inward of the first cutting edge and a breaker wall surface inward of the second cutting edge; and
at least one convex portion formed in the cutting edge member between the two breaker wall surfaces spaced from each other in such a manner as to relatively protrude toward the side of the cutting edge with respect to the breaker wall surface,
wherein a part of the convex portion is situated in the vicinity of a connecting portion of the first cutting edge and the second cutting edge.

According to the cutting tool having such structure, the convex portion formed to protrude relatively is provided between the breaker wall surface located inward of the first cutting edge and the breaker wall surface located inward of the second cutting edge located at the corner portion, and a part of the convex portion is situated in the vicinity of the connecting portion of the first cutting edge and the second cutting edge. Accordingly, in the cutting operation with a change in involvement in a workpiece within a range from the first cutting edge to the second cutting edge, the conjunction between the one convex portion and the two breaker wall surfaces on both sides of the convex portion can suitably apply a force to chips, for example, to promote curl to the chips, enhancing the chip treatability.

The cutting edge member preferably includes a sintered compact. The sintered compact may include at least one material of diamond and cubic boron nitride, and preferably, may be composed of at least one of them as a principal component.

The convex portion is preferably formed in the vicinity of the connecting portion of the first cutting edge and the second cutting edge in a position closer to the second cutting edge. More preferably, this is applied when the first cutting edge is a linear cutting edge and the second cutting edge is a corner cutting edge. The cutting edge member may be formed with mirror-image symmetry about a bisector of an outline shape of the corner portion when viewed from the direction opposite to the rake surface. In this case, preferably, the first cutting edge extends on one side of the bisector and the connecting portion of the first cutting edge and the second cutting edge is located on the same side of the bisector. The number of the convex portions may be two.

The convex portion preferably has either a flat surface or a convex curve surface curved so as to swell outwardly. The convex portion may be formed to be contiguous with the cutting edge. For example, the flat surface or the convex curve surface of the convex portion preferably extends to the cutting edge.

Preferably, an elevated breaker wall surface is further formed in a position at a greater distance from the cutting edge than the breaker wall surfaces and in a position at a level higher than the breaker wall surfaces so that a chip breaker has at least a two-stage structure. Preferably, in the order from the cutting edge, the breaker wall surfaces are formed on a first stage, and the elevated breaker wall surfaces are formed on a second stage. In this case, preferably, the convex portion is formed between the two breaker wall surfaces on the first stage, and an elevated convex portion is formed between the two elevated breaker wall surfaces on the second stage. Preferably, the elevated convex portion is located in an offset position from the convex portion on the first stage with respect to the cutting edge.

The cutting tool may be formed to be mounted directly to a machine tool, and may be formed as a cutting insert. When formed as the cutting insert, the present invention may be present also in a cutting tool comprising a tool body to which the cutting insert is detachably mounted.

DESCRIPTION OF EMBODIMENTS

A cutting tool according to the present invention will be described below, based on embodiments thereof.

As illustrated in FIG. 1 to FIG. 5, a cutting tool 1 according to a first embodiment of the present invention has four corner portions. The region including one corner portion 2 of the corner portions is formed with a cutting edge member 3. The cutting edge member 3 contains an ultrahigh-pressure sintered compact and is fixedly brazed to a cut-away portion 1b of an insert substrate 1a. In the insert substrate 1a a through hole 1f is formed so as to penetrate the upper surface 1u and the lower surface so that a mounting member such as a lever or the like is inserted through the through hole 1f for mounting to a tool body. In other words, the cutting tool 1 is a cutting insert (i.e., a cutting member) detachably mounted to the tool body. The cutting tool 1 having an ultrahigh-pressure sintered compact is hereinafter referred to as the cutting insert 1 for the purpose of brief explanation. However, the ultrahigh-pressure sintered compact in the first embodiment is a sintered compact predominantly composed of Cubic Boron Nitride. The cutting inert 1 is intended to cut high-hardness material, but may be used for cutting a workpiece made of other materials. In this regard, the cutting tool 1 having an ultrahigh-pressure sintered compact may be called an ultra-high sintered compact cutting tool.

Figure 1:
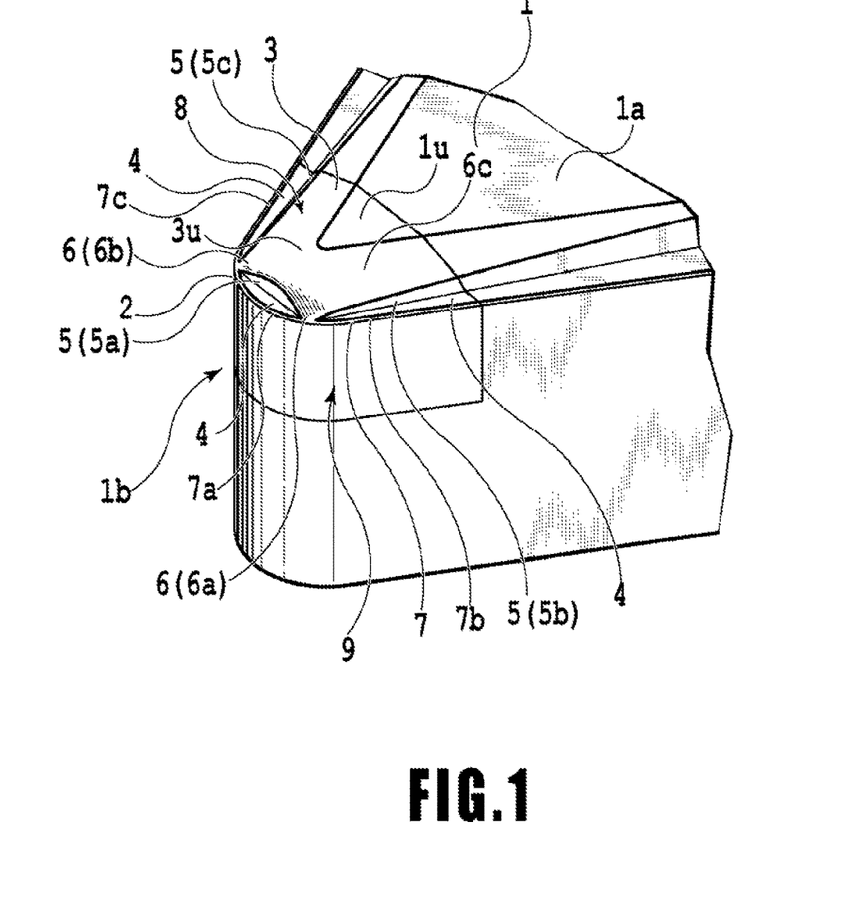
FIG. 1 is an enlarged perspective view of a leading end of a cutting tool according to a first embodiment of the present invention.
Figure 2:
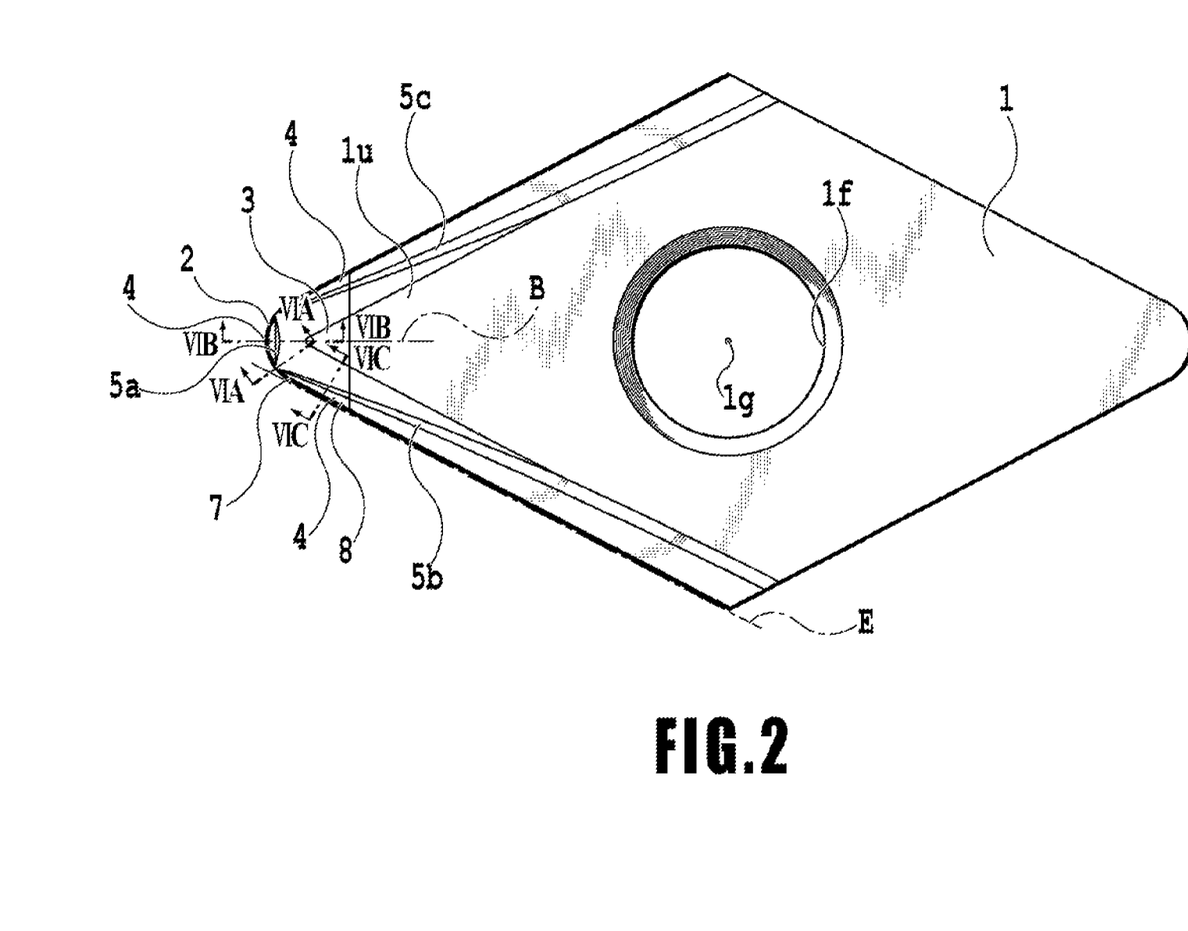
FIG. 2 is a plan view of the cutting tool in FIG. 1.
Figure 3:
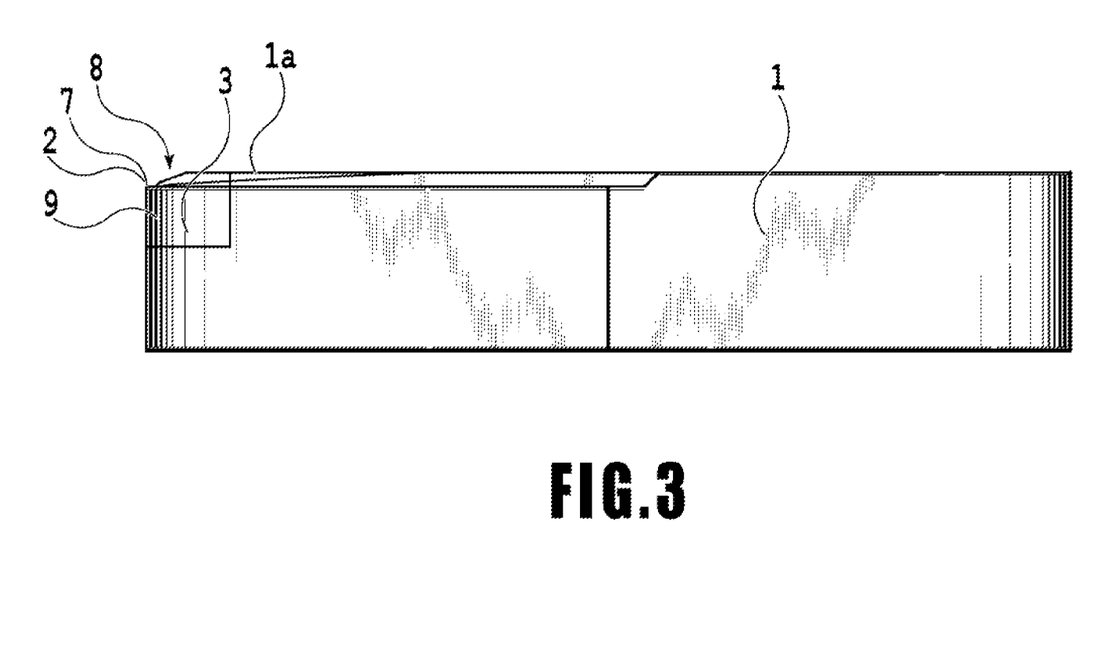
FIG. 3 is a front view of the cutting tool in FIG. 1.
Figure 4:
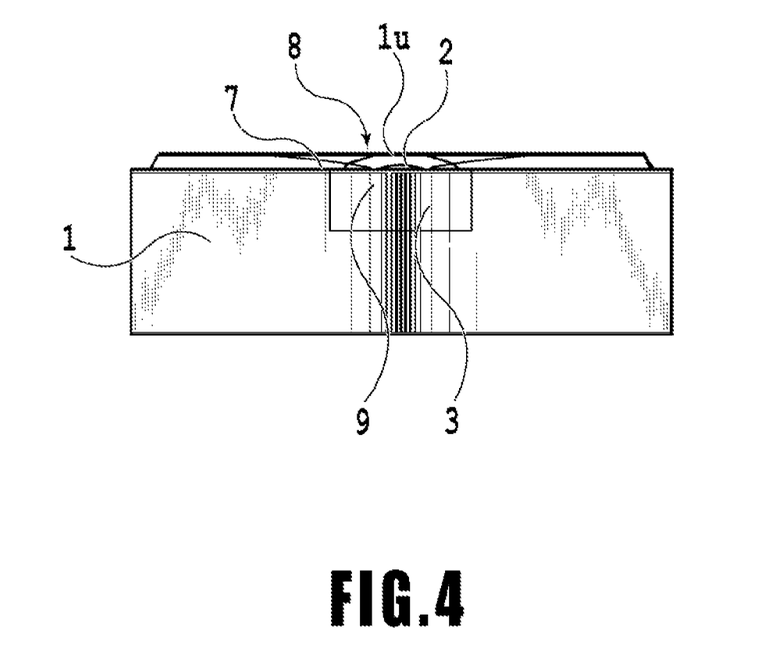
FIG. 4 is a left side view of the cutting tool in FIG. 1.
Figure 5:
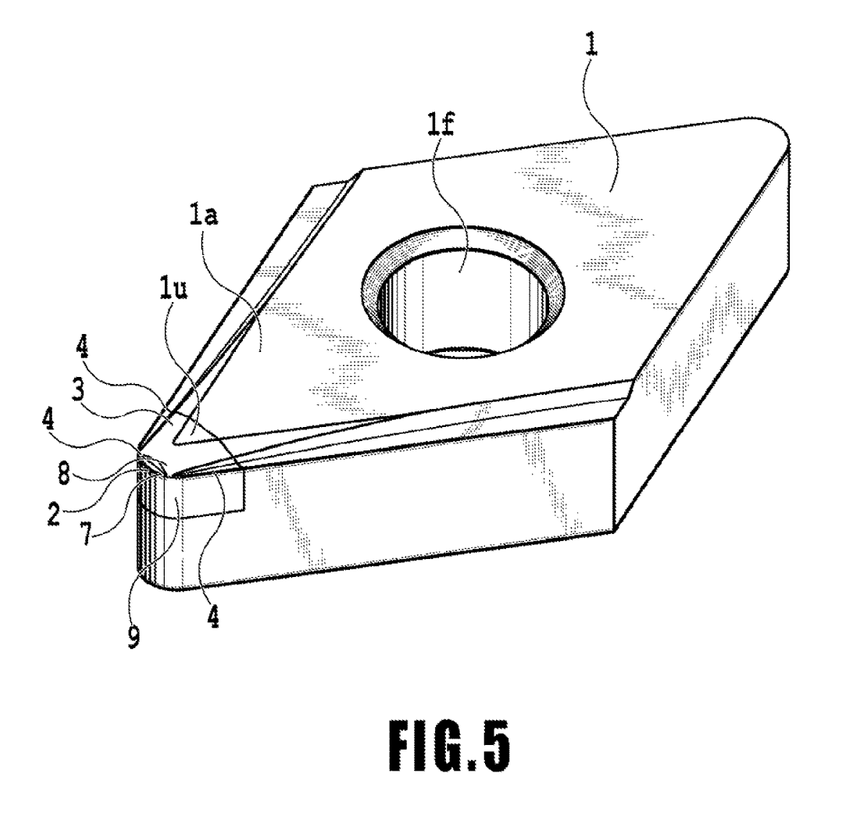
FIG. 5 is a perspective view of the cutting tool in FIG. 1.

The cutting insert 1 has a rake surface 8 formed on the upper surface 1u illustrated in top view in FIG. 2, a flank 9 formed on a peripheral side surface extending between the upper surface 1u and the lower surface, and a cutting edge 7 at the intersection of the rake face 8 and the flank 9. The rake surface 8, the flank 9 and the cutting edge 7 are formed to extend beyond the range of the cutting edge member 3, but they may be formed only within the cutting edge member 3. The surface of the cutting edge member 3 corresponding to a portion of the upper surface of the cutting insert is referred to as the upper surface of the cutting edge member, and likewise the surface of the periphery of the cutting edge member corresponding to a portion of the peripheral side surface of the cutting insert is referred to as the side surface of the cutting edge member.

The cutting edge 7 includes a corner cutting edge 7a situated in the corner 2 to be curved along the corner portion 2, a first linear cutting edge 7b connected to one end of the corner cutting edge 7a, and a second linear cutting edge 7c connected to the other end of the corner cutting edge 7a. The first linear cutting edge 7b and the second linear cutting edge 7c each extend from the cutting edge member 3 to the insert substrate 1a, as seen from FIG. 1, FIG. 2 and FIG. 5.

Three chip breaker grooves 4 are formed on the upper surface (front surface) 1u of the cutting insert 1. In the cutting insert 1, the three chip breaker grooves 4 are independently separate from each other. Each of the chip breaker grooves 4 has a breaker wall surface 5. One of the chip breaker grooves 4 extends along the corner cutting edge 7a, another chip breaker groove 4 extends along the first linear cutting edge 7b, and the remaining chip breaker groove 4 extends along the second linear cutting edge 7c.

In order to allow for both left-hand use and right-hand use, the cutting insert 1 in the embodiment is formed in a shape with mirror-image symmetry about the bisector B of the outline shape of the corner portion 2 in FIG. 2 when viewed from the direction opposite to the rake surface (upper surface) 8. That is, the plurality of chip breaker grooves 4 are arranged in mirror-image symmetry about the bisector of the outline shape of the corner portion 2 when viewed from the direction opposite to the rake surface 8.

Specifically, the chip breaker groove 4 having a first breaker wall surface 5a disposed in the corner portion 2 is formed inward of the corner cutting edge 7a and in a shape with mirror-image symmetry about the bisector B of the outline shape of the corner portion 2 in FIG. 2. Incidentally, the corner cutting edge 7a is also formed in a shape with mirror-image symmetry about the bisector B in FIG. 2. The chip breaker groove 4 having a second breaker wall surface 5b is formed inward of the first linear cutting edge 7b for right-hand use. The chip breaker groove 4 having a third breaker wall surface 5c is formed inward of the second linear cutting edge 7c for left-hand use. In FIG. 2, the second breaker wall surface 5b and the third breaker wall surface 5c are arranged with mirror-image symmetry about the bisector B and have a mirror-image symmetric shape in relation to each other. This mirror-image symmetric relationship is established between the first linear cutting edge 7b and the second linear cutting edge 7c. In this manner, all portions (including the cutting edge member 3) in the cutting insert 1 according to the embodiment have the mirror-image symmetry relationship about the bisector B of the outline shape of the corner portion 2 in FIG. 2. Given these circumstances, for the sake of simplicity in the following description, a description is mainly given of one side of the bisector B in which the first linear cutting edge 7*b* is placed, and a description on the other side of the mirror-image symmetry is actually omitted. Note that the expression of the "wall surface" (i.e., the breaker wall surface) is used herein about a surface upward extending so as to be raised, which is, however, used for the sake of convenience and is not intended to define absolute orientation and/or positional relationship in a space. The same holds true for other terms expressing orientation and/or positional relationship in a space.

A convex portion (convex shaped portion) 6 is formed between the two breaker wall surfaces 5 which are adjacent to each other. Specifically, a first convex portion 6*a* is formed between the first breaker wall surface 5*a* and the second breaker wall surface 5*b* which are located at a distance from each other. Likewise, a second convex portion 6*b* is formed between the first breaker wall surface 5*a* and the third breaker wall surface 5*c*. Each of the convex portions is formed between two adjacent breaker wall surfaces 5 spaced from each other in such a manner as to relatively protrude toward the side of the cutting edge 7 with respect to the breaker wall surface. In this manner, it should be noted that, in the cutting insert 1, placing the chip breaker grooves 4 on both sides of the convex portion makes the convex portion appear to protrude relative to the breaker wall surface 5 of the chip breaker groove 4. In other words, the convex portion 6 is formed in a convex shape with respect to the breaker wall surfaces 5 on both adjacent sides, with the convex shape being formed by forming its surrounding in a concave shape. In the present invention, the convex portion is not limited to be formed positively in a convex shape and may be formed negatively in a convex shape.

The chip breaker grooves 4 are formed such that the width of each of the breaker wall surfaces 5*a*, 5*b* is decreased with closer proximity to the convex portion 6*a*. In the cutting insert 1, the width of the breaker wall surface approaches approximately zero in the proximity to the convex portion 6*a*, but may be a predetermined width to some extent. Likewise, the chip breaker grooves 4 are formed such that the width of each of the breaker wall surfaces 5*a*, 5*c* is decreased with closer proximity to the convex portion 6*b*. In the cutting insert 1, hence, the breaker wall surface 5*a* has a maximum width at a position corresponding to the bisector B, but is not limited to this.

In the embodiment, further, the first and second convex portions 6*a*, 6*b* are formed to have a wall face along a single common curved surface so that the first and second convex portions 6*a*, 6*b* are joined integrally. Specifically, the first and second convex portions 6*a*, 6*b* are formed as a part of a single convex curve shaped portion 6*c*. If such a forming manner is employed, the convex curve shaped portion 6*c* may be formed through grinding or the like to facilitate forming the two convex portions 6*a*, 6*b*, leading to a reduction in manufacturing cost.

In addition, each convex portion 6 is formed near the connecting portion of the linear cutting edge and the corner cutting edge. The first convex portion 6*a* is situated near the connecting portion of the first linear cutting edge 7*b* and the corner cutting edge 7*a*. In addition, the first convex portion 6*a* is situated so as to be located inward of the corner cutting edge 7*a*. In this connection, referring to FIG. 2, an extension E is set by extending the first linear cutting edge 7*b*. The extension E passes through the connecting portion of the first linear cutting edge 7*b* and the corner cutting edge 7*a*. In FIG. 2, the convex portion 6 extends toward a portion of the cutting insert at which the extension E separates from the cutting insert. In this manner, the first convex portion 6*a* is situated in the vicinity of the connecting portion of the first linear cutting edge 7*b* and the corner cutting edge 7*a*, and also is located closer to the corner cutting edge 7*a*. This is the same for the second convex portion 6*b*.

Figure 6A:
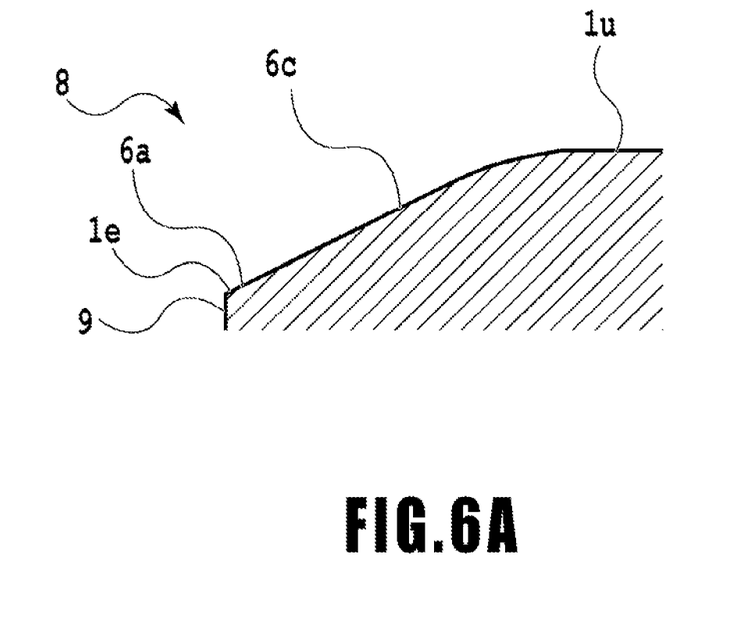
FIG. 6A is a schematic cross-sectional view of a part of the cutting tool in FIG. 1, taken along VIA-VIA line in FIG. 2.
Figure 6B:
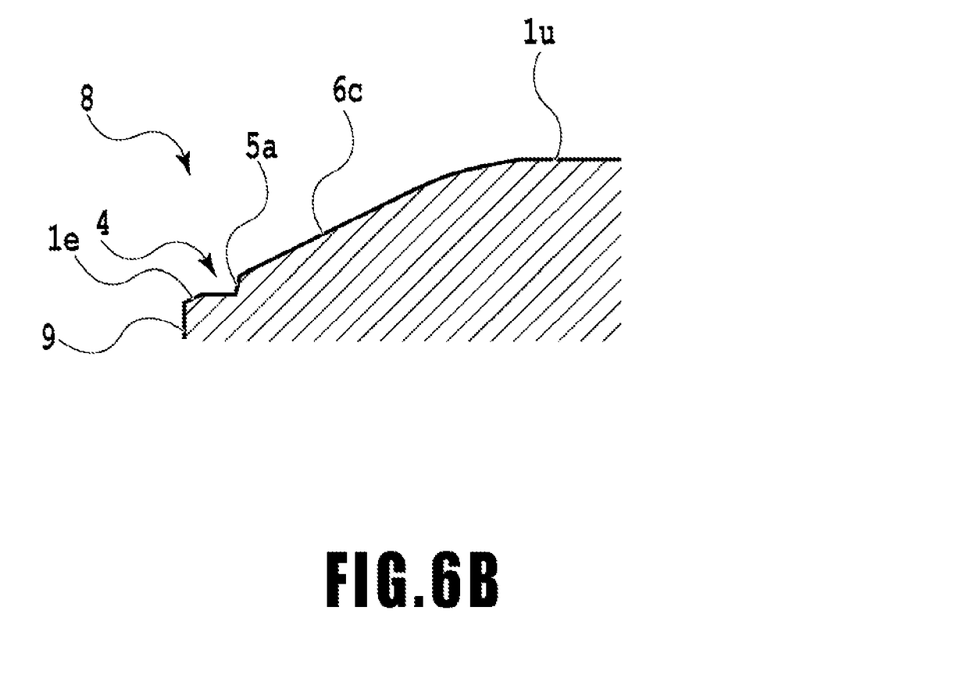
FIG. 6B is a schematic cross-sectional view of a part of the cutting tool in FIG. 1, taken along VIB-VIB line in FIG. 2.
Figure 6C:
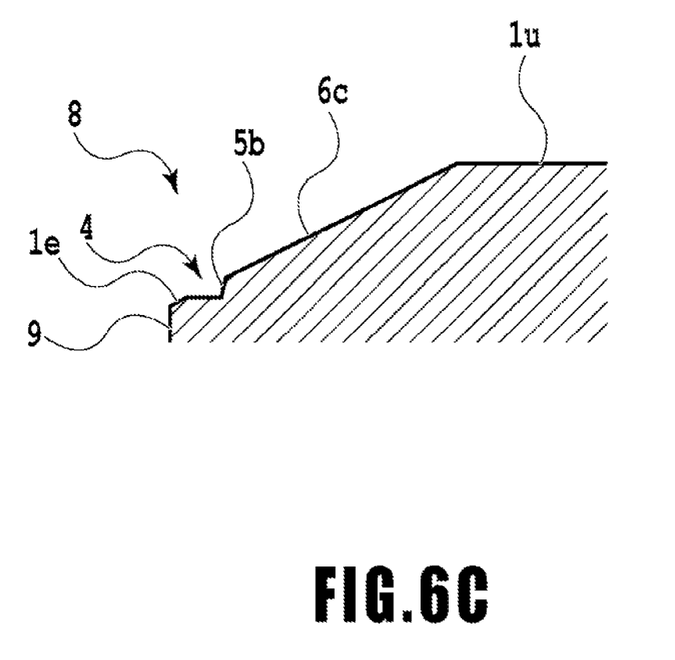
FIG. 6C is a schematic cross-sectional view of a part of the cutting tool in FIG. 1, taken along VIC-VIC line in FIG. 2.

Here, the shapes of the convex portion 6 and the chip breaker groove 4 are described. FIG. 6A illustrates schematically a cross section of a part of the cutting insert 1 taken along VIA-VIA line in FIG. 2. FIG. 6B illustrates schematically a cross section of a part of the cutting insert 1 taken along VIB-VIB line (i.e., the bisector B) in FIG. 2. FIG. 6C illustrates schematically a cross section of a part of the cutting insert 1 taken along VIC-VIC line in FIG. 2. In FIG. 2, the VIA-VIA line, the VIB-VIB line and the VIC-VIC line each intersect with a corresponding cutting edge at right angles. The VIA-VIA line crosses the first convex portion 6*a*. The VIB-VIB line crosses the first breaker wall surface 5*a*. The VIC-VIC line crosses the second breaker wall surface 5*b*. FIGS. 6A to 6C exaggerate shape characteristics with less emphasis on accuracy of dimensions of each portion, a ratio between portions and the like.

FIG. 6A shows the convex curve shaped portion 6*c* with the convex portion 6*a* extending through a honing surface 1*e* toward the corner cutting edge 7*a*. In this case, the convex curve shaped portion 6*c*, which is formed integrally with the honing surface 1*e*, extends to the corner cutting edge 7*a* in effect. FIG. 6B shows the first breaker wall surface 5*a* of the chip breaker groove 4 being at a distance from the honing surface 1*e*. Further, FIG. 6C shows the second breaker wall surface 5*b* of the chip breaker groove 4 being at a distance from the honing surface 1*e*. Thus, it is clear from FIGS. 6A to 6C that the convex portion 6*a* is formed toward the side of the cutting edge 7 beyond the first and second breaker wall surfaces 5*a*, 5*b* to protrude toward the side of the cutting edge 7 with respect to the breaker wall surfaces.

Each of the first and second convex portions 6*a*, 6*b* may be formed to be continuous with the cutting edge 7. Forming the convex portion in such a way makes it possible to exert a force on just-generated chips to control the chip flow (in other words, a restraining force) in a position closer to the cutting edge 7, leading to a significant improvement in chip treatability.

In the embodiment, the first and second convex portions 6*a*, 6*b* are formed in a convex curve shape, but are not limited thereto. Each convex portion 6 may be structured to simply have a flat surface oriented toward the side of the cutting edge. The convex portion 6 may have a curve surface curved in substantially dome shape projecting in the outward direction also in a cross section at right angles to the cutting edge (see the VIA-VIA line in FIG. 2). The convex portion 6 may be of polyhedron structure with a large number of flat surfaces arranged to be analogous to a convex curve surface. Each of the convex portions 6 may be structured to include at least two convex wall-surface portions for chip control in the vicinity of the cutting edge 7. Specifically, the convex portion can include the convex wall-surface portion on the side of the corner-cutting-edge 7*a* and the convex wall-surface portion on the side of the first linear cutting edge 7*b*.

The cutting insert 1 has the chip breaker grooves 4 each formed in a substantially groove shape as a concave portion. Such formation makes it possible to use grinding and/or the like to facilitate forming the chip breaker groove 4, leading to a reduction in manufacturing cost. In the cutting insert 1, the bottom (the cutting-edge side portion) of each chip breaker groove 4 is formed substantially parallel to, preferably, parallel to the lower surface (see FIG. 6B and FIG. 6C).

Here, since the upper surface and the lower surface of the cutting insert 1 are substantially parallel, the bottom of the chip breaker groove is substantially parallel to the upper surface. In the cutting insert 1, the bottom of the chip breaker groove is designed to be a flat surface extending substantially perpendicular to the axis 1g of the mount hole 1f. However, the bottom of the chip breaker groove is not limited to this. The shape of each chip breaker groove 4 can be selected from various chip breaker shapes. The chip breaker groove 4 (that is, the chip breaker wall surface 5) is designed to act in conjunction with the convex portion 6. As described below, because of the interaction of the combination of the convex portion 6 and the chip breaker groove 4, the cutting insert 1 according to the embodiment enables a significant improvement in the chip treatability in cutting operation in which chips are more likely to vary the direction of chip flow as compared with the conventional cutting inserts.

When the cutting insert 1 is used as a right-hand cutting tool, the first breaker wall surface 5a and the second breaker wall surface 5b act in conjunction with the first convex portion 6a. When the cutting insert 1 is used as a left-hand cutting tool, the first breaker wall surface 5a and the third breaker wall surface 5c act in conjunction with the second convex portion 6b. Here, a description is given of the operation of the cutting insert 1 used as a right-hand cutting tool, and a description of the operation of the cutting insert 1 used as a left-hand cutting tool is omitted.

Typically, smaller cut and smaller feed are set as the cutting conditions in the cutting operation, in particular, in the turning operation or the milling operation using a sintered compact of Cubic Boron Nitride for the cutting edge 7 (that is, cutting edge member 3). Chips thus generated are narrow in width and thin in thickness, tending to make it very difficult to perform the chip control. In particular, in carrying out the profiling machining in a lathe, changes frequently occur on an area involved in the cutting in the corner portion 2, causing significant changes of the direction of chip flow. Because of this, the chip control is made very difficult.

Figure 7:
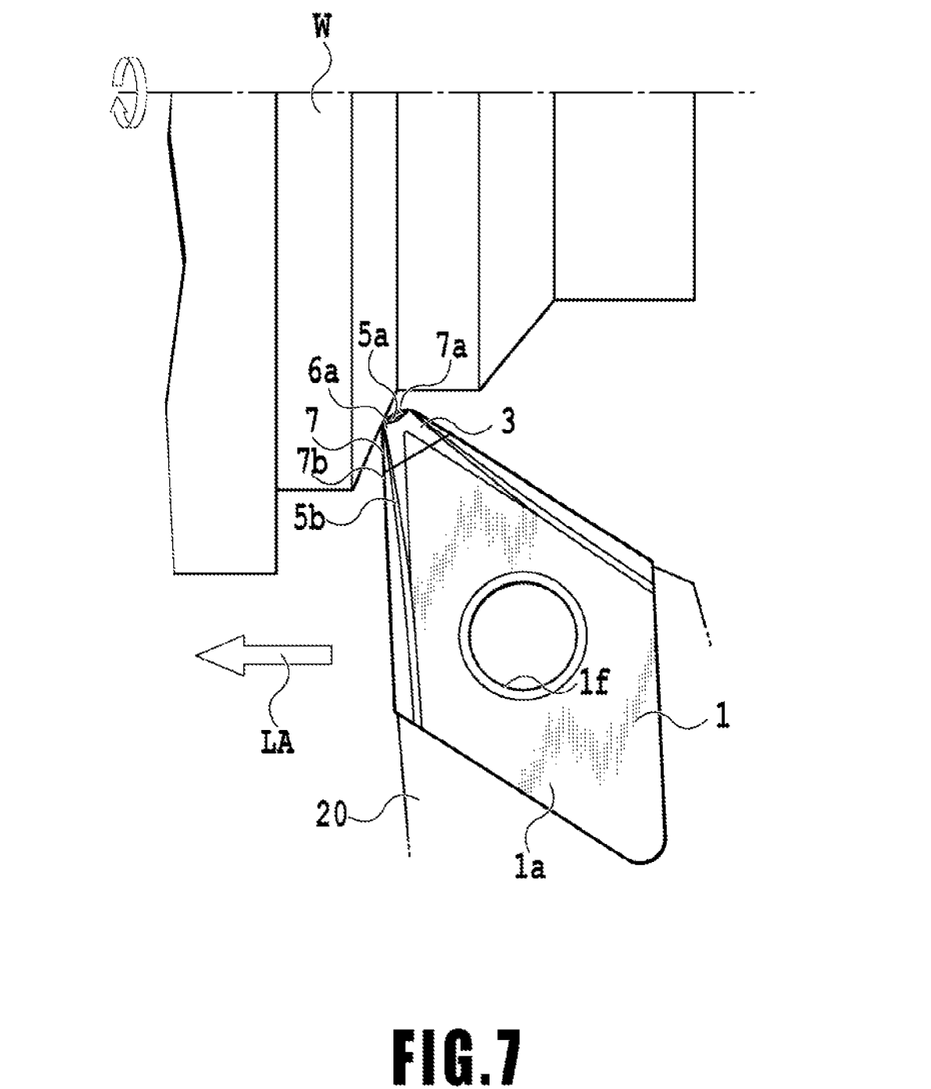
FIG. 7 is a view illustrating an example of use of the cutting tool in FIG. 1 with a mounting member being omitted.

FIG. 7 schematically shows the state of carrying out the profiling machining in a lathe using a turning tool (a cutting tool) of which the cutting insert 1 is detachably attached to the leading end of a holder 20 (serving as the tool body). Arrow LA in FIG. 7 indicates the feed direction of the turning tool. It is evident from the shape of a workpiece W illustrated in FIG. 7 that the direction of chip flow greatly varies during the cutting operation.

In the cutting insert 1 according to the embodiment, when chips are generated around the leading end of the cutting insert 1, that is, when chips are generated around the bisector of the outline shape of the corner portion 2, the first breaker wall surface 5a acts on the chips in conjunction with the first convex portion 6a. The first breaker wall surface 5a is provided to ensure the appropriate functioning of the chip breaker in response to changes in chip generation location, enabling control on the chip flow with more reliability. However, when the chip generation location further changes to be beyond an approximate midpoint of the first convex portion 6a toward the side of the first linear cutting edge, then, the second breaker wall surface 5b acts in conjunction with the first convex portion 6a. As a result, even when the chip generation location significantly changes relative to the cutting edge in the profiling machining or the like, the breaker wall surfaces and the convex portion which follow the generation location are able to continue reliable control on the chip flow at all times. For this reason, as compared with the conventional cutting inserts, the cutting insert 1 is capable of significantly improving the chip treatability.

Figure 8:
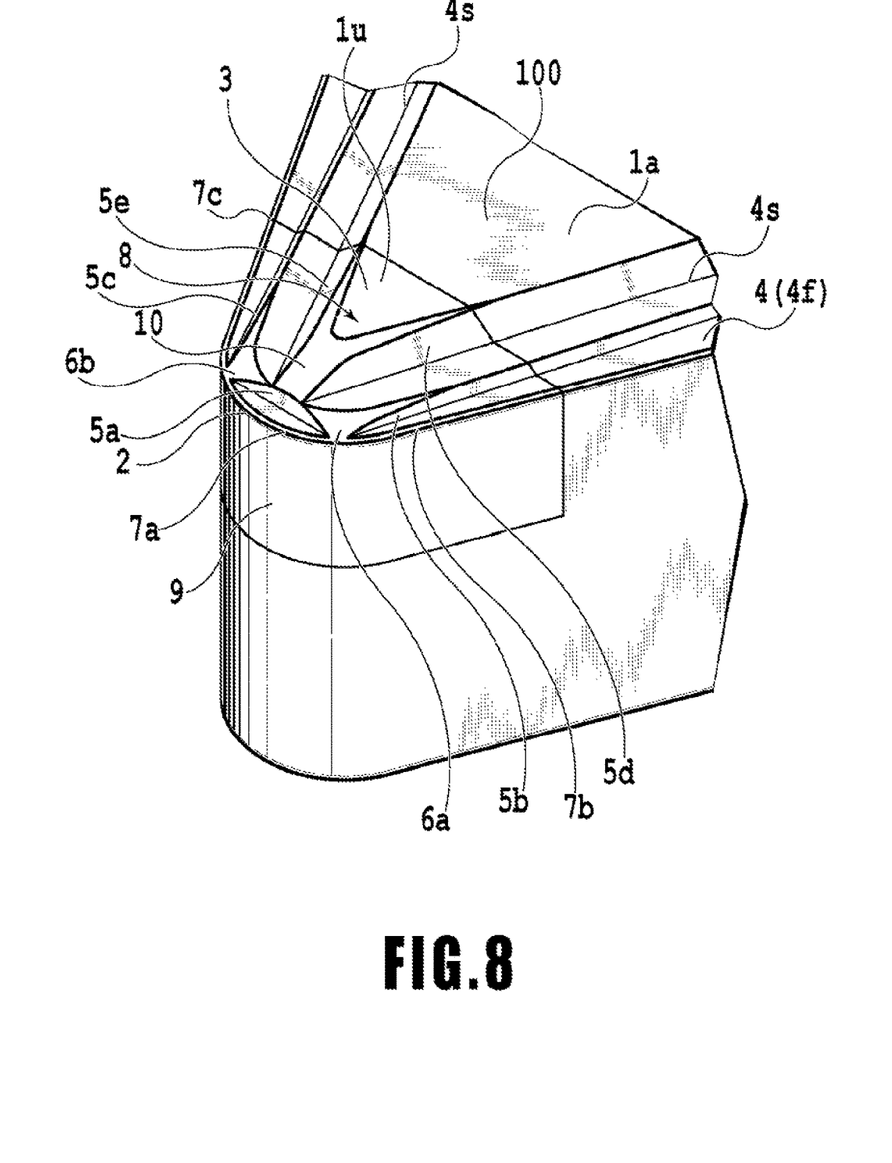
FIG. 8 is an enlarged perspective view of a leading end of a cutting tool according to a second embodiment of the present invention.
Figure 9:
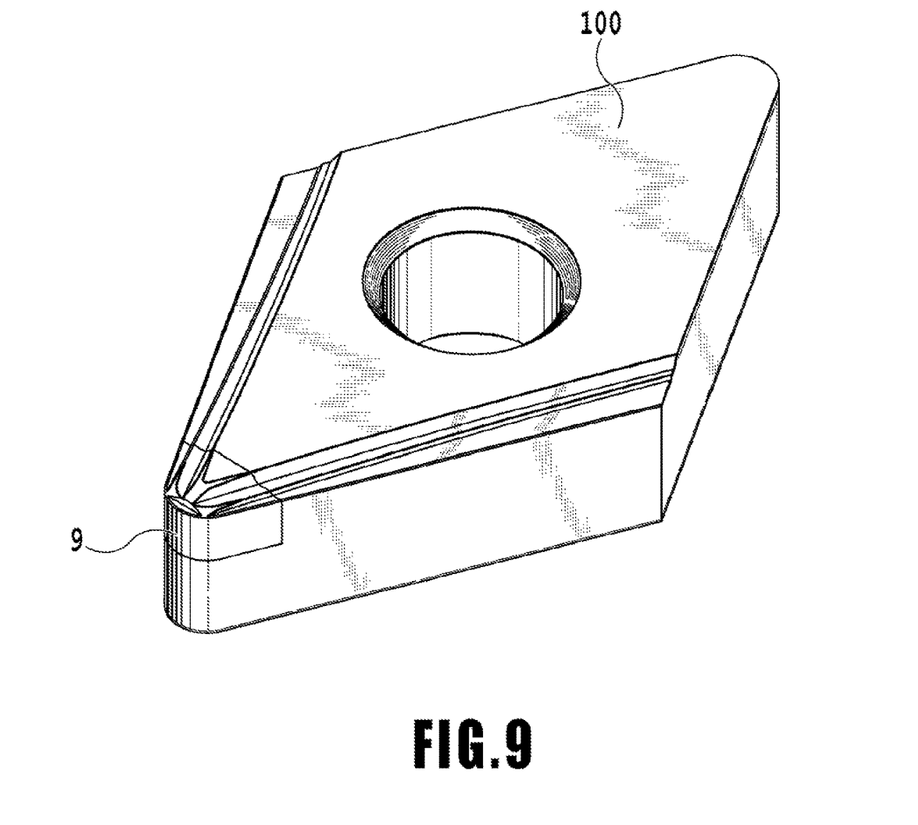
FIG. 9 is a perspective view of the cutting tool in FIG. 8.

Next, a cutting tool 100 according to a second embodiment of the present invention will be described. FIG. 8 and FIG. 9 illustrate the cutting tool 100 according to the second embodiment. The cutting tool 100 is also structured as a cutting insert. In the following description of the cutting insert 100, structural portions corresponding to the structural portions of the cutting insert 1 in the first embodiment are designated by the same reference numerals as those used above, and a repeated description thereof is omitted. The cutting insert 100 in this embodiment includes a chip breaker having two-stage structure. The emphasis in the following description is placed on this respect.

In the order of proximity of the cutting edge 7, a chip breaker groove 4 ("4f" in FIG. 8) is formed on the first stage and a chip breaker groove 4s is formed on the second stage. With the two chip breaker grooves 4s on the second stage, a fourth breaker raised wall surface 5d and a fifth breaker raised wall surface 5e are formed. Because the breaker wall surfaces 5d, 5e on the second stage are located at a level higher than the breaker wall surfaces 5a, 5b, 5c on the first stage (further away from the cutting edge in the direction of the axis 1g), they are referred to as an elevated breaker wall surface.

The chip breaker designed to have the two-stage structure makes it possible to further enhance the chip treatability. Specifically, thin chips formed in relatively small feed are able to be treated by the synergistic action of the convex portions 6a, 6b and the breaker wall surfaces 5a, 5b, 5c on the first stage. Thick chips formed in relatively large feed may flow over the breaker wall faces 5a, 5b, 5c on the first stage. In this event, such chips can be further treated by the synergistic action of the elevated breaker wall surfaces 5d, 5e on the second stage and a convex portion 10 on the second stage. The convex portion 10 between the two elevated breaker wall surfaces 5d, 5e on the second stage is located at a level higher than the cutting edge 7 as compared with the convex portion 6 located between the breaker wall surfaces on the first stage, thus being referred to as an elevated convex portion. The elevated convex portion 10 is connected to the first beaker wall surface 5a and protrudes toward a portion of the cutting edge in an offset position from a portion of the cutting edge adjoining the convex portion 6 on the first stage. In particular, the elevated convex portion 10 is formed to be situated on the bisector B of the corner portion 2 in plan view. In the arrangement of the convex portion 6 on the first stage and the elevated convex portion 10 on the second stage in offset positions from each other with respect to the cutting edge as in the embodiment, even if the chips flowing in various directions are generated in the cutting operation, it is possible to reduce the chips discharged without making contact with either the breaker wall surface or the convex portion. As a result, a significant enhancement in chip treatability can be achieved.

The first and second embodiments according to the present invention have been described above, and various changes are possible. The tool materials of and around the cutting edge 7 (that is, materials of sintered compact) may be selected from hard materials such as CBN (Cubic Boron Nitride) and the like. Diamond together with or in place of Cubic Boron Nitride may be used as hard materials. If diamond is used, it may be polycrystalline diamond. Further, if, in particular, Cubic Boron Nitride is used for the surface of the hard materials, a PVD or CVD coating may be applied. In this manner, the cutting edge member 3 is preferably formed from a sintered compact including at least one of Cubic Boron Nitride and diamond or formed including the sintered compact, and further a PVD or CVD coating may be applied to the surface of the sintered compacts.

The above-described cutting tools 1, 100 can be attached in a machine tool to be utilized for cutting steel materials and/or the like. Only the cutting inserts 1, 100 for a lathe are described as the embodiment, but the present invention is applicable to a turning tool for a lathe or a rotation cutting tool in another aspect. Those skilled in the art will recognize that the present invention has almost no limitations to cutting tools to which the present invention is applied. For example, the cutting tools 1, 100 are respectively the cutting inserts, but the present invention may be applied to a cutting edge portion of a turning brazed tool for a lathe.

Each of the cutting inserts 1, 100 according to the embodiments of the present invention has only one cutting edge. However, the cutting insert may have a plurality of cutting edges. For example, a plurality of cutting edges may be arranged in rotational symmetry about the axis of the mount hole, and the aforementioned structure may be adopted into each of the cutting edges. Further, a cutting edge may be provided on each of the upper and lower surfaces (that is, the two opposite surfaces), and the aforementioned structure may be adopted into each of the cutting edges.

A plurality of corner portions 2 may be formed in a single cutting edge member 3. In this case, the aforementioned structure may be adopted into each of the plurality of corner portions. The single corner portion is not limited to having the cutting edge (or a cutting edge section) formed therein to include one corner cutting edge and two linear cutting edges, and a cutting edge including one corner cutting edge and one linear cutting edge (or non-corner cutting edge) may be formed.

In the embodiments, the linear cutting edge (corresponding to a first cutting edge of the present invention) has a substantially linear shape both in plan view and in side view. However, the first cutting edge of the present invention is not limited to having a linear shape, and may be curved in at least one of plan view and side view. In the embodiments, the corner cutting edge (corresponding to a second cutting edge of the present invention) is substantially parallel to the upper and lower surfaces in side view. However, the present invention does not rule out that the second cutting edge is curved in side view.

Diamond may be used for the ultrahigh-pressure sintered compact and the cutting tool according to the present invention may have a chip breaker shape suitable for cutting an aluminum alloy. A finishing edge portion such as a wiper edge may be formed in a portion of the cutting edge 7.

The present invention has been described with a certain degree of concretion in the aforementioned embodiments, but the present invention is not limited to them. It should be understood that various modifications and changes are possible to the present invention without departing from the spirit and the scope of the present invention as set forth in the claims. In other words, the present invention includes all various modifications, applications and its equivalents covered by the concept of the present invention defined in the appended claims.

The invention claimed is:

1. A cutting tool including a cutting edge member forming at least one corner portion, the cutting tool comprising:
   a cutting edge formed at the intersection of a rake surface and a flank, the cutting edge including a first cutting edge and a second cutting edge connected to the first cutting edge, the second cutting edge being situated in the corner portion of the cutting edge member;
   at least two breaker wall surfaces including a breaker wall surface inward of the first cutting edge and a breaker wall surface inward of the second cutting edge; and
   at least one convex portion formed in the cutting edge member between the two breaker wall surfaces spaced from each other in such a manner as to relatively protrude toward the side of the cutting edge relative to the breaker wall surfaces, wherein
   the convex portion is connected to and protruding from the two breaker wall surfaces,
   a part of the convex portion is situated in the vicinity of a connecting portion of the first cutting edge and the second cutting edge, and
   an edge of the convex portion includes a part of the cutting edge.

2. The cutting tool according to claim 1, wherein the cutting edge member includes a sintered compact including at least one material of diamond and cubic boron nitride.

3. The cutting tool according to claim 1, wherein:
   the first cutting edge is a linear cutting edge and the second cutting edge is a corner cutting edge; and
   the convex portion is formed in the vicinity of the connecting portion of the first cutting edge and the second cutting edge in a position closer to the second cutting edge.

4. The cutting tool according to claim 1, wherein the cutting edge member is formed with mirror-image symmetry about a bisector of an outline shape of the corner portion when viewed from the direction opposite to the rake surface, and, on one side of the bisector, the first cutting edge extends and the connecting portion of the first cutting edge and the second cutting edge is located.

5. The cutting tool according to claim 1, wherein the number of the convex portions is two.

6. The cutting tool according to claim 1, wherein the convex portion has either a flat surface or a convex curve surface curved so as to swell outwardly.

7. The cutting tool according to claim 6, wherein:
   the convex portion is contiguous with the cutting edge; and
   either said flat surface or said convex curve surface extends to the cutting edge.

8. The cutting tool according to claim 1, wherein an elevated breaker wall surface is further formed in a position at a greater distance from the cutting edge than the breaker wall surfaces and in a position at a level higher than the breaker wall surfaces so that a chip breaker has at least two-stage structure.

9. The cutting tool according to claim 8, wherein:
   in order from the cutting edge, the breaker wall surfaces are formed on a first stage, and the elevated breaker wall surfaces are formed on a second stage;
   the convex portion is formed between the two breaker wall surfaces on the first stage, and an elevated convex portion is formed between the two elevated breaker wall surfaces on the second stage; and
   the elevated convex portion is located in an offset position from the convex portion with respect to the cutting edge.

10. The cutting tool according to claim 1, wherein the cutting tool is formed as a cutting insert.

11. A cutting tool, comprising a tool body to which a cutting insert is detachably mounted, wherein the cutting insert includes a cutting edge member forming at least one corner portion, wherein the cutting insert comprises:

a cutting edge formed at the intersection of a rake surface and a flank, the cutting edge including a first cutting edge and a second cutting edge connected to the first cutting edge, the second cutting edge being situated in the corner portion of the cutting edge member;

at least two breaker wall surfaces including a breaker wall surface inward of the first cutting edge and a breaker wall surface inward of the second cutting edge; and at least one convex portion formed in the cutting edge member between the two breaker wall surfaces spaced from each other in such a manner as to relatively protrude toward the side of the cutting edge relative to the breaker wall surfaces, wherein the convex portion is connected to and protruding from the two breaker wall surfaces, a part of the convex portion is situated in the vicinity of a connecting portion of the first cutting edge and the second cutting edge, and an edge of the convex portion includes a part of the cutting edge.

12. A cutting insert comprising a cutting edge member brazed to an insert substrate, the cutting edge member comprising:

a cutting edge formed at the intersection of a rake surface and a flank, the cutting edge including:

a curved corner cutting edge formed at a corner portion of the cutting edge member, the corner cutting edge having an associated first breaker wall surface inward of the corner cutting edge;

a first linear cutting edge extending from a first side of the corner cutting edge, the first linear cutting edge having an associated second breaker wall surface inward of the first linear cutting edge; and a first convex portion separating the first and second breaker wall surfaces, the first convex portion being situated in the vicinity of a connecting portion of the curved corner cutting edge and the first linear cutting edge, wherein the convex portion is connected to and protruding from the first and second breaker wall surfaces, and an edge of the first convex portion includes a part of the cutting edge.

13. The cutting insert according to claim 12, wherein:
a width of each of the first and second breaker wall surface decreases with closer proximity to the first convex portion.

14. The cutting insert according to claim 12, wherein:
the first convex portion is contiguous with the cutting edge;
the first convex portion has either a flat surface or a convex curve surface curved so as to swell outwardly; and
said flat surface or said convex curve surface extends to the cutting edge.

15. The cutting insert according to claim 12, further comprising:
an elevated breaker wall surface associated with the first linear cutting edge, the elevated breaker wall surface being at a greater distance from the first linear cutting edge than the second breaker wall surface, and being situated at a level higher than the second breaker wall surface;
whereby a chip former of the cutting edge member has at least two-stage structure.

16. The cutting insert according to claim 12, wherein the cutting edge member further comprises:
a second linear cutting edge extending from a second side of the corner cutting edge, the second linear cutting edge having an associated third breaker wall surface inward of the second linear cutting edge; and
a second convex portion separating the first and third breaker wall surfaces, the second convex portion being situated in the vicinity of a connecting portion of the curved corner cutting edge and the second linear cutting edge.

17. The cutting insert according to claim 16, wherein:
the cutting edge member is formed with mirror-image symmetry about a bisector of an outline shape of the corner portion when viewed from the direction opposite to the rake surface.

18. The cutting insert according to claim 16, further comprising:
a fourth breaker wall surface associated with the first linear cutting edge, the fourth breaker wall surface being at a greater distance from the first linear cutting edge than the second breaker wall surface, and being situated at a level higher than the second breaker wall surface;
a fifth breaker wall surface associated with the second linear cutting edge, the fifth breaker wall surface being at a greater distance from the second linear cutting edge than the third breaker wall surface, and being situated at a level higher than the third breaker wall surface; and
an elevated convex portion separating the fourth and fifth breaker wall surfaces.

19. The cutting insert according to claim 18, wherein:
a chip breaker of the cutting edge member has at least a first stage and a second stage, the second stage being farther from the cutting edge than the first stage;
the first, second and third breaker wall surfaces are formed on the first stage;
the fourth and fifth breaker wall surfaces are formed on a second stage; and
the elevated convex portion is offset from the first and second convex portions, with respect to the cutting edge.

* * * * *